(12) United States Patent
Ohta

(10) Patent No.: US 7,676,160 B2
(45) Date of Patent: Mar. 9, 2010

(54) SUPERVISORY CONTROLLING METHOD AND SUPERVISORY CONTROLLING SYSTEM OF OPTICAL REPEATER

(75) Inventor: Kenji Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 919 days.

(21) Appl. No.: 10/094,798

(22) Filed: Mar. 12, 2002

(65) Prior Publication Data

US 2003/0072064 A1 Apr. 17, 2003

(30) Foreign Application Priority Data

Oct. 12, 2001 (JP) .............................. 2001-314949

(51) Int. Cl.
H04B 10/20 (2006.01)
(52) U.S. Cl. ..................... 398/181; 398/79; 398/177
(58) Field of Classification Search ................ 398/6, 398/11, 18, 37, 92, 157, 177, 178, 181; 359/334, 359/337
See application file for complete search history.

(56) References Cited

U.S. PATENT DOCUMENTS

| 5,500,756 | A | * | 3/1996 | Tsushima et al. ............ 398/181 |
| 5,535,037 | A | * | 7/1996 | Yoneyama ................... 398/181 |
| 5,877,878 | A | * | 3/1999 | Horiuchi et al. ............... 398/18 |
| 6,292,289 | B1 | * | 9/2001 | Sugaya et al. ............... 359/337 |
| 6,301,404 | B1 | * | 10/2001 | Yoneyama ................... 385/24 |
| 6,404,527 | B1 | * | 6/2002 | Jensen ........................ 398/177 |
| 6,414,775 | B1 | * | 7/2002 | Pedersen ..................... 398/177 |
| 6,934,479 | B2 | * | 8/2005 | Sakamoto et al. ........... 398/193 |
| 2002/0041431 | A1 | * | 4/2002 | Ohshima et al. ............. 359/334 |
| 2003/0099030 | A1 | * | 5/2003 | Kumasako et al. .......... 359/334 |
| 2004/0190909 | A1 | * | 9/2004 | Akasaka et al. ............. 398/173 |
| 2004/0196158 | A1 | * | 10/2004 | Sugaya et al. ............. 340/815.4 |
| 2004/0213567 | A1 | * | 10/2004 | Deguchi et al. ............... 398/32 |
| 2004/0257640 | A1 | * | 12/2004 | Yamaguchi .................. 359/334 |
| 2004/0257642 | A1 | * | 12/2004 | Fishman et al. ........... 359/341.3 |
| 2005/0024714 | A1 | * | 2/2005 | Hayashi et al. ............. 359/334 |

FOREIGN PATENT DOCUMENTS

| EP | 001427075 A2 | * | 6/2004 |
| JP | 03-239023 | | 10/1991 |
| JP | 03-239028 | | 10/1991 |
| JP | 05-284110 | | 10/1993 |
| JP | 2000-183820 | | 6/2000 |
| JP | 2000-314902 | | 11/2000 |

OTHER PUBLICATIONS

Notice of Reasons for Rejection (Office Action) in corresponding JP Patent Application No. 2001-314949 mailed Dec. 13, 2005.

* cited by examiner

*Primary Examiner*—Dzung D Tran

(57) ABSTRACT

The present invention aims at providing a technique capable of supervising and controlling optical repeaters, without affecting transmission characteristics and wavelength bands of signal lights, by utilizing the Raman effect. To this end, the present invention provides a supervisory controlling system of an optical repeater, in an optical amplifying-and-repeating transmission system for amplifying and repeatingly transmitting signal light propagated through an optical transmission path by the optical repeater, wherein the supervisory control signal light is amplified due to the Raman effect by the signal light acting as excitation light in an optical transmission path (Raman amplifying medium), to thereby supervise and control the optical repeater in accordance with the thus Raman amplified supervisory control signal light.

10 Claims, 8 Drawing Sheets

OPTICAL REPEATER 5

AN EXAMPLE OF SIGNAL LIGHT RAMAN AMPLIFIED
IN CASE ALL OF EXCITATION LIGHT ARE MODULATED

AN EXAMPLE OF SIGNAL LIGHT RAMAN AMPLIFIED
IN CASE OF THIRD EMBODIMENT

FREQUENCY CHARACTERISTIC OF TYPICAL EDFA

AN EXAMPLE OF SIGNAL LIGHT RAMAN AMPLIFIED IN CASE OF FIFTH EMBODIMENT

SUPERVISORY CONTROLLING METHOD AND SUPERVISORY CONTROLLING SYSTEM OF OPTICAL REPEATER

BACKGROUND OF THE INVENTION (1) Field of the Invention

The present invention relates to a supervisory controlling technique of an optical repeater to be applied to various optical communications systems, and particularly to a supervisory controlling method and a supervisory controlling system for transmitting supervisory control information making use of the Raman effect.

(2) Related Art

In various optical communications systems, it has been desired to further increase capacities of the systems due to increased data communication traffics such as in the Internet. As a method to realize increased capacities of optical communications systems, attention has been directed to a WDM optical transmission system for transmitting wavelength-division multiplexed (WDM) signal light including a plurality of optical signals of different wavelengths. Further, there has been also advanced development of an optical amplifying-and-repeating transmission system for amplifying a signal light by optical repeaters adopting optical amplifiers so as to perform the repeating transmission of the signal light.

In the conventional optical amplifying-and-repeating transmission system, as an optical amplifier used in optical repeater, there has been utilized an optical fiber amplifier that supplies an excitation light to such as an optical fiber doped with rare earth element to thereby amplify a signal light. Specifically, as an optical amplifier of optical repeater, there has been widely used an optical fiber amplifier (EDFA) that utilizes an optical fiber doped with Erbium as a rare earth element.

For the optical repeater utilizing such an EDFA, there is known a method to perform a supervisory control of operating conditions and the like, in accordance with supervisory control information to be transmitted together with a signal light between a transmission side terminal device and a reception side terminal device in a system. In a conventional supervisory controlling method of the optical repeater, as a specific method to transmit a signal light accompanied by supervisory control information toward the reception side terminal device from the optical repeater, for EDFA of an optical repeater, there has been proposed a method, as shown in (A) of FIG. 11, for supplying an excitation light which is modulated in accordance with information about supervisory control to an erbium doped fiber (EDF), to thereby apply the modulation of several percents onto the whole of signal light Ls. Alternatively, for example, as shown in (B) of FIG. 11, there has been proposed a method to provide a dedicated channel for supervisory control at an end portion of an amplification band of EDFA and to multiplex a supervisory control signal light Lsv and a signal light Ls.

However, for the conventional supervisory controlling method as mentioned above, in case of transmitting the supervisory control information by applying the modulation onto the excitation light for the EDFA, there is a possibility to cause an increase of penalty in receiving and processing the signal lights at the terminal device due to the modulated components superimposed onto the signal lights, respectively. Further, there is a problem that the transmission characteristics of the WDM signal light are fluctuated depending on wavelengths, because it is difficult to equally apply the modulation onto the optical signals of all the wavelengths included in the WDM signal light, respectively. On the other hand, in case of transmitting the supervisory control signal light by providing the dedicated channel, since at least one of waves within the amplification band of the optical amplifier is occupied for the supervisory control, there is defectively caused constraints on the effective usage of the limited amplification band of the optical amplifier, thereby resulting in a narrowed wavelength band for the signal lights.

Meanwhile, there have been investigated optical repeaters for amplifying and repeatingly transmitting signal lights by utilizing the Raman effect, such as by virtue of the recent development of optical fibers or high power light sources. The light amplification (Raman amplification) using the Raman effect utilizes such a phenomenon that, when a strong light (excitation light) is propagated through an amplifying medium such as an optical fiber, there is caused a Raman scattering phenomenon in which the thus input light is converted into a light (a Stokes light) of a longer wavelength, and further, if there exists a light (light to be amplified) coincident with the wavelength range where the Stokes light is generated, the wavelength conversion becomes frequent to thereby amplify the light to be amplified (stimulated Raman scattering). Such Raman amplification has an advantage capable of forming an amplification band in an arbitrary wavelength range, and has a wide amplification range. Thus, it is expected to apply those optical repeaters utilizing the Raman amplification to optical amplifying-and-repeating transmission systems, so as to enable to further widen the bands of the optical repeaters utilizing such as the aforementioned conventional EDFA's.

However, even in such optical repeaters utilizing the Raman amplification, it is also assumed that the aforementioned supervisory control is performed, thereby causing the same problem as in the above, if the conventional supervisory controlling method is applied in the same manner as the above. To solve such a problem concerning the supervisory control, it is demanded to realize a novel supervisory controlling technique taking account of the features of the Raman amplification.

SUMMARY OF THE INVENTION

The present invention has been carried out in view of the circumstances as described above, and it is therefore an object of the present invention to provide a supervisory controlling method and supervisory controlling system capable of supervising and controlling optical repeaters, without affecting transmission characteristics or wavelength bands of signal lights, by utilizing the Raman effect.

To achieve the above object, one aspect of the present invention provides, in an optical amplifying-and-repeating transmission system for amplifying and repeatingly transmitting a signal light propagated through an optical transmission path by an optical repeater, a supervisory controlling method for supervising and controlling the optical repeater in accordance with supervisory control information to be transmitted together with the signal light, wherein a supervisory control signal light having a wavelength capable to be amplified due to the Raman effect by the signal light is Raman amplified in a Raman amplifying medium on the optical transmission path by the signal light as an excitation light, to thereby supervise and control the optical repeater in accordance with the Raman amplified supervisory control signal light. Further, for this supervisory controlling method, the wavelength of the supervisory control signal light is preferably set at the outside of the wavelength band of the signal light.

According to such a supervisory controlling method, the supervisory control signal light for supervising and controlling the optical repeater on the optical amplifying-and-repeating transmission system is amplified due to the Raman effect in which the signal light transmitted through the optical transmission path together with the supervisory control signal light acts as the excitation light, and repeatedly transmitted. Thus, it is possible to avoid such a conventional situation where, when the modulation is applied onto signal lights themselves so as to transmit the supervisory control information, the modulated components affect the transmission characteristics of the signal lights. Further, if the wavelength of the supervisory control signal light is set at the outside of the wavelength band of the signal light, it becomes possible to effectively use the amplification band for the signal light, since the supervisory control signal light does not occupy a part of the amplification band for the signal light, differently from the conventional technique.

Further, for the above supervisory controlling method, in the Raman amplifying medium, the signal light may be amplified due to the Raman effect by the excitation light supplied from the optical repeater, so that the supervisory control signal light is Raman amplified by the thus Raman amplified signal light acting as the excitation light. In addition, this supervisory controlling method may be constituted to monitor the Raman amplified supervisory control signal light by the optical repeater to thereby detect information about a transmission state of the signal light, and to control a supplying state of the excitation light from the optical repeater to the Raman amplifying medium corresponding to the thus detected information, to thereby control a Raman amplification state of the supervisory control signal light in the Raman amplifying medium.

According to such a supervisory controlling method, the signal light acting as the excitation light for Raman amplifying the supervisory control signal light is also Raman amplified by the excitation light supplied from the optical repeater to the Raman amplifying medium. Thus, it becomes possible to amplify the signal light over a wide band, to repeatedly transmit the same. Further, if the supplying state of the excitation light to the Raman amplifying medium is controlled corresponding to the information to be indicated by the supervisory control signal light monitored by the optical repeater, it becomes possible to control the Raman amplification of the signal light and supervisory control signal light to a desired state corresponding to changes in the number of wavelengths of the signal light, the wavelength arrangement and the like.

The above mentioned supervisory controlling method may be constituted, when the optical transmission path includes an up-link and a down-link, at the optical repeater, the Raman amplified supervisory control signal light is separated from the lights propagated through the up-link, and the thus separated supervisory control signal light is branched into two branched lights at a previously set ratio, so that one of the branched lights is returned to the up-link and the other branched light is sent to the down-link to be folded, and at the same time, the Raman amplified supervisory control signal light is separated from the lights propagated through the down-link, and the thus separated supervisory control signal light is branched into two branched lights at a previously set ratio, so that one of the branched light is returned to the down-link and the other branched light is sent to the up-link to be folded.

According to such a supervisory controlling method, a part of the supervisory control signal light propagated through the optical transmission path is looped back in the optical repeater. Thus, it becomes possible to, for example, in the terminal device and the like on the system, to detect the supervisory control signal light that has been sent out by the terminal itself and has been folded back by the optical repeater, to thereby obtain information about the input signal light power and the like of the optical repeater.

Another aspect of the present invention provides, in an optical amplifying-and-repeating transmission system for amplifying and repeatingly transmitting a wavelength-division multiplexed (WDM) signal light propagated through an optical transmission path by an optical repeater, a supervisory controlling method for supervising and controlling the optical repeater in accordance with supervisory control information transmitted together with the WDM signal light, wherein when the optical repeater supplies a plurality of excitation lights of different wavelengths to a Raman amplifying medium on the optical transmission path, to Raman amplify and repeatedly transmit the WDM signal light, among the plurality of excitation lights to be supplied to the Raman amplifying medium, the modulation is applied onto the excitation light enabling to Raman amplify the signal lights at longer wavelength side included in the WDM signal light, to thereby return a response signal to a supervisory controlling command.

According to such a supervisory controlling method, the response signal to the supervisory controlling command is superimposed only onto the longer wavelength side optical signals in the WDM signal light to be returned, by applying the modulation onto the excitation light corresponding to the longer wavelength side optical signals, among the plurality of excitation lights for Raman amplifying the signal light. Thus, it becomes possible to prevent the occurrence of penalty due to the modulated components, by performing a simple adjustment for the modulated state of the excitation light corresponding to the longer wavelength side optical signals.

Further objects, features and advantages of the present invention will become more apparent from the following description of preferred embodiments when read in conjunction with the accompanying drawings.

BRIEF DESCRIPTION OF THE DRAWINGS

FIG. 11 is a view showing an example of a conventional method for transmitting supervisory control information together with signal lights, in which FIG. 11(A) shows a case where the modulation is applied onto signal lights and FIG. 11(B) shows a case where a dedicated channel for supervisory control is provided.

DETAILED DESCRIPTION OF THE PREFERRED EMBODIMENT

There will be described hereinafter embodiments according the present invention, with reference to the accompanying drawings.

Figure 1:
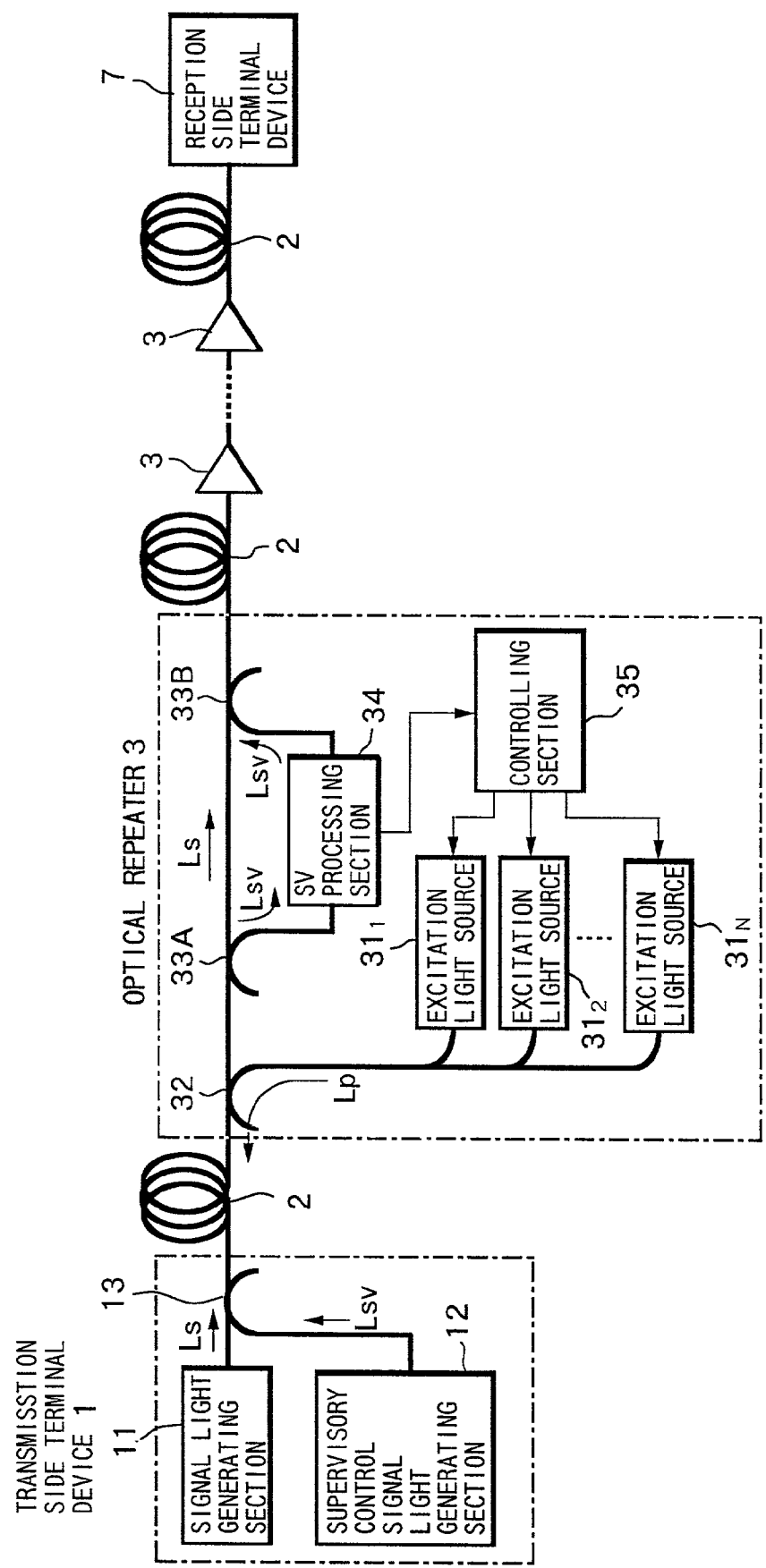
FIG. 1 is a block diagram showing a first embodiment of a supervisory controlling system of an optical repeater according to the present invention.

FIG. 1 is a block diagram showing a first embodiment of a supervisory controlling system of an optical repeater according to the present invention.

In FIG. 1, the supervisory controlling system of the first embodiment is constituted to supervise and control each optical repeater 3 in accordance with a supervisory control signal light Lsv transmitted together with signal lights Ls, for example, in an optical amplifying-and-repeating transmission system for Raman amplifying and repeatingly transmitting the signal lights Ls to be transmitted from a transmission side terminal device 1 to a reception side terminal device 7 via an optical transmission path 2 by each optical repeater 3, such that the supervisory control signal light Lsv has a wavelength capable to be amplified due to the Raman effect by the signal lights Ls, so that the supervisory control signal light Lsv is Raman amplified by the signal lights Ls acting as excitation lights in the optical transmission path 2.

The transmission side terminal device 1 includes, for example, a signal light generating section 11, a supervisory control signal light generating section 12 and a WDM coupler 13. The signal light generating section 11, for example, generates a WDM signal light including a plurality of optical signals of different wavelengths as the signal lights Ls to be transmitted to the reception side terminal device 7 to output the thus generated WDM signal light to the WDM coupler 13. The supervisory control signal light generating section 12 generates the supervisory control signal light Lsv including information for supervising and controlling each optical repeater 3, to output the supervisory control signal light Lsv to the WDM coupler 13. A wavelength λsv of the supervisory control signal light Lsv is capable to be amplified due to the Raman effect by the signal lights Ls generated by the signal light generating section 11, and, herein, this wavelength λsv is set at the outside of the wavelength band of the signal lights Ls. Note, a specific example of wavelength setting of signal lights Ls and of supervisory control signal light Lsv will be described later. The WDM coupler 13 multiplexes the signal lights Ls from the signal light generating section 11 and the supervisory control signal light Lsv from the supervisory control signal light generating section 12 to send out the multiplexed light to the optical transmission path 2.

The optical transmission path 2 is a typical one that connects between the transmission side terminal device 1 and reception side terminal device 7. It is assumed that the optical transmission path 2 is arranged with optical repeaters 3 at required intervals, and the optical transmission path 2 between respective repeating zones shall functions as a Raman amplifying medium.

Each optical repeater 3 is to amplify, due to the Raman effect, for example, the signal lights Ls propagated through the optical transmission path 2, to repeatedly transmit the amplified signal lights Ls, and includes herein, excitation light sources $31_1$, $31_2$, ... $31_N$ in N numbers and a WDM coupler 32, that cooperatively act as an excitation light supplying section that supplies excitation lights to the optical transmission path 2 (Raman amplifying medium), and WDM couplers 33A, 33B and an SV processing section 34, that cooperatively act as a detecting section that monitors the supervisory control signal light Lsv to thereby detect the information about the transmission state of the signal lights Ls, and a controlling section 35 that controls driving conditions of the excitation light sources $31_1$, to $31_N$ corresponding to the information detected by the SV processing section 34.

The excitation light sources $31_1$ to $31_N$ generate lights of mutually different wavelengths $\lambda_{P1}$ to $\lambda_{PN}$, and the multiplexed light of these lights is sent to the WDM coupler 32 as excitation light Lp for Raman amplifying the signal lights Ls. The WDM coupler 32 supplies the excitation light Lp from the excitation light sources $31_1$ to $31_N$ to the optical transmission path 2 connected to the input side of the optical repeater 3, and at the same time transmits the lights propagated through the optical transmission path 2 (signal lights Ls and supervisory control signal light Lsv) to the WDM coupler 33A at the latter stage of the WDM coupler 32 itself. Herein, the excitation light Lp to be supplied to the optical transmission path 2 via the WDM coupler 32 is propagated in a direction opposite to the direction of the signal lights Ls.

The WDM coupler 33A wavelength-separates the supervisory control signal light Lsv from the light sent from the optical transmission path 2 via the WDM coupler 32, to send the wavelength-separated light Lsv to the SV processing section 34. The SV processing section 34 detects the transmission state (for example, the number of wavelengths and the wavelength arrangement of the WDM signal light) of the signal lights Ls based on the supervisory control signal light Lsv from the WDM coupler 33A, to send the detection result to the controlling section 35 and also to output, to the WDM coupler 33B, the supervisory control signal light Lsv to be sent to the optical repeater 3 at the latter stage and to the reception side terminal device 7. The WDM coupler 33B multiplexes the supervisory control signal light Lsv from the SV processing section 34 into the signal lights Ls having passed through the WDM coupler 33A, to send out the thus multiplexed light to the optical transmission path 2 connected to the output side of the optical repeater 3.

The reception side terminal device 7 is to receive the signal lights Ls and supervisory control signal light Lsv that have been repeatedly transmitted from the transmission side terminal device 1 via the optical transmission path 2 and optical repeaters 3, to perform a required receipt processing.

In the supervisory controlling system having the aforementioned constitution, the signal lights Ls transmitted from the transmission side terminal device 1 are amplified up to required levels due to the Raman effect by the excitation light Lp supplied from the corresponding optical repeater 3 in the optical transmission path 2 at each repeating zone, and the supervisory control signal light Lsv to be transmitted together with the signal lights Ls is also amplified up to a required level due to the Raman effect caused by the just Raman amplified signal lights Ls as the excitation light so that the signal lights Ls and supervisory control signal light Lsv are repeatedly transmitted to the reception side terminal device 7.

Figure 2:
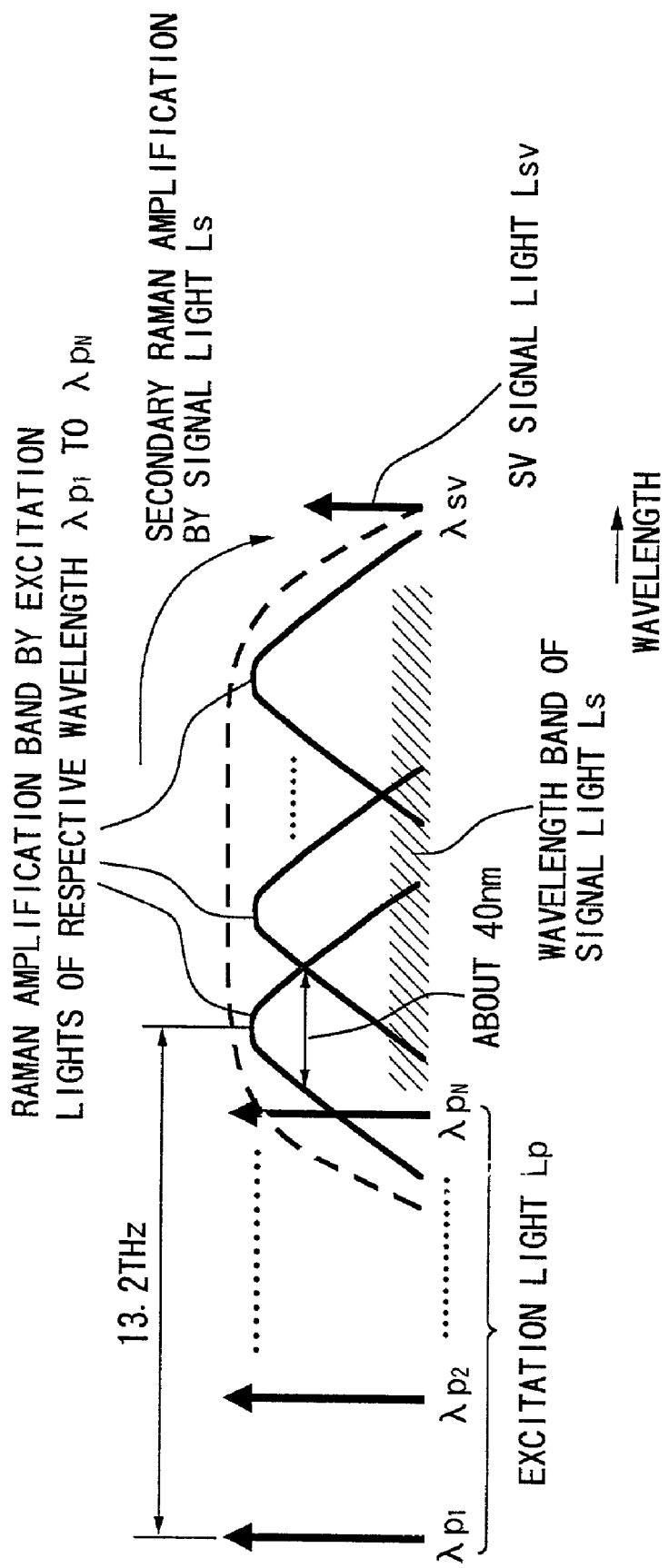
FIG. 2 is a view for explaining Raman amplification of signal lights and supervisory control signal light in the first embodiment.

Such Raman amplification of the signal lights Ls and supervisory control signal light Lsv is realized by suitably setting the wavelengths $\lambda_{P1}$ to $\lambda_{PN}$ of the excitation light sources $31_1$ to $31_N$ in the optical repeater 3 and the wavelength $\lambda_{sv}$ of the supervisory control signal light Lsv, for example, as shown in FIG. 2. Namely, each Raman amplification band to be caused by the excitation light Lp has a gain that becomes maximum at a position which is lower by 13.2 THz in frequency than the associated one of the lights of the wavelengths $\lambda_{P1}$ to $\lambda_{PN}$ included in the excitation lights Lp. Therefore, by mutually combining the Raman amplification bands to be caused corresponding to the wavelengths $\lambda_{P1}$ to $\lambda_{PN}$, it becomes possible to obtain a substantially flat Raman amplification band as indicated by a broken line in FIG. 2. Thus, if the wavelengths $\lambda_{p1}$ to $\lambda_{PN}$ of the excitation light sources $31_1$ to $31_N$ are set such that the wavelength band of the signal lights Ls is included in the Raman amplification band by the excitation lights Lp, it becomes possible to Raman amplify the signal lights Ls up to required levels. Specifically in a case where a range of 1530 nm to 1610 nm is assumed as the wavelength band for signal lights Ls, for example, it is enough to set the wavelengths $\lambda_{P1}$ to $\lambda_{PN}$ such that the wavelength range of the excitation lights Lp covers substantially between 1430 nm and 1510 nm.

Further, secondary Raman amplification bands, to be caused by the signal lights Ls having been Raman amplified by the excitation lights Lp as the excitation lights, are obtained at positions which are lower by 13.2 THz in frequency than the signal lights Ls, respectively. Therefore, if the wavelength λsv of the supervisory control signal light Lsv is set corresponding to any one of the secondary Raman amplification bands, it becomes possible to Raman amplify the supervisory control signal light Lsv up to a required level. Specifically, it is considered that the Raman amplification caused by a single wavelength light included in the excitation light Lp has a band of about 40 nm. Therefore, the optical signals included in a band of about 40 nm in the vicinity of 1530 nm corresponds to the signal lights Ls to be Raman amplified by the excitation light of the wavelength set at 1460 nm, for example. Then, in case of signal lights Ls wavelength multiplexed at 0.4 nm of wavelength interval, about 100 waves of optical signals are Raman amplified by the excitation light of 1460 nm. By utilizing optical signals of about 100 waves near 1530 nm as excitation lights, there can be obtained the secondary Raman amplification band having a sufficient gain level near 1640 nm outside the wavelength band of the signal lights Ls. Thus, if the wavelength λsv of the supervisory control signal light Lsv is set to about 1640 nm, it becomes possible to Raman amplify the supervisory control signal light Lsv up to a required level.

As understood from the aforementioned specific example, the wavelength λsv of the supervisory control signal light Lsv is set to a shorter wavelength side within the secondary Raman amplification band caused by the signal lights Ls as the excitation lights. However, the wavelength setting is not limited thereto, and it is possible to set the wavelength λsv at an arbitrary position within the secondary Raman amplification bands caused by the signal lights Ls. Only, the wavelengths setting of the supervisory control signal light Lsv shall be performed by sufficiently considering loss wavelength characteristics of the optical transmission path 2 to be used, a wavelength arrangement of optical signals included in the signal lights Ls, or the like, because the level of the supervisory control signal light Lsv to be transmitted among the optical repeaters 3 is determined by the relationship between the transmission loss in the optical transmission path 2 and the Raman gains by the signal lights Ls.

Based on the aforementioned wavelength setting, the signal lights Ls and supervisory control signal light Lsv propagated through the optical transmission path 2 are Raman amplified to be input to each optical repeater 3. At each optical repeater 3, the lights having been propagated through the optical transmission path 2 pass through the WDM coupler 32 to be sent to the WDM coupler 33A, and the supervisory control signal light Lsv having been Raman amplified in the optical transmission path 2 is wavelength separated by the WDM coupler 33A to be sent to the SV processing section 34. At the SV processing section 34, the supervisory control signal light Lsv is received and processed, so that the information about the transmission state, such as, the number of wavelengths and the wavelength arrangement of the signal lights Ls is detected and sent to the controlling section 35. At the controlling section 35, the driving conditions of the excitation light sources $31_1$ to $31_N$ are controlled in accordance with the detected information from the SV processing section 34 so that the desired Raman amplification for the signal lights Ls and supervisory control signal light Lsv is realized even when the transmission states of the signal lights Ls are changed, to thereby optimize the setting of excitation light powers of the wavelengths $\lambda_{P1}$ to $\lambda_{PN}$ to be supplied to the optical transmission path 2. Then, the operating condition of the optical repeater 3 controlled by the controlling section 35 is reflected in the supervisory control signal light Lsv to be sent to the WDM coupler 33B from the SV processing section 34, to be transmitted to the optical repeaters 3 at the latter stages and the reception side terminal device 7.

In this way, according to the supervisory controlling system of the first embodiment, each optical repeater 3 of the optical amplifying-and-repeating transmission system is supervised and controlled in accordance with the supervisory control signal light Lsv that is Raman amplified by the signal lights Ls acting as excitation lights, thereby enabling to avoid such a conventional situation where, when signal lights themselves are modulated so as to transmit the supervisory control information, the modulated components affect the transmission characteristics of the signal lights. Further, since the wavelength λsv of the supervisory control signal light Lsv is set to the outside of the wavelength band of the signal lights Ls, the supervisory control signal light Lsv does not occupy a part of the amplification band for the signal lights Ls, thereby enabling to effectively use the amplification band for the signal lights Ls. Moreover, the signal lights Ls are also Raman amplified by supplying the excitation lights Lp to the optical transmission path 2 from the optical repeater 3, so that the signal lights Ls can be amplified and repeatedly transmitted over a wider band. In addition, the driving conditions of the excitation light sources $31_1$ to $31_N$ of the optical repeater 3 are controlled in accordance with the transmission states of the signal lights Ls, thereby enabling to control the Raman amplification of the signal lights Ls and supervisory control signal light Lsv to desired conditions corresponding to such as the number of wavelengths and the wavelength arrangement of the signal lights Ls.

There will be described hereinafter a second embodiment of a supervisory controlling system of an optical repeater according to the present invention.

Figure 3:
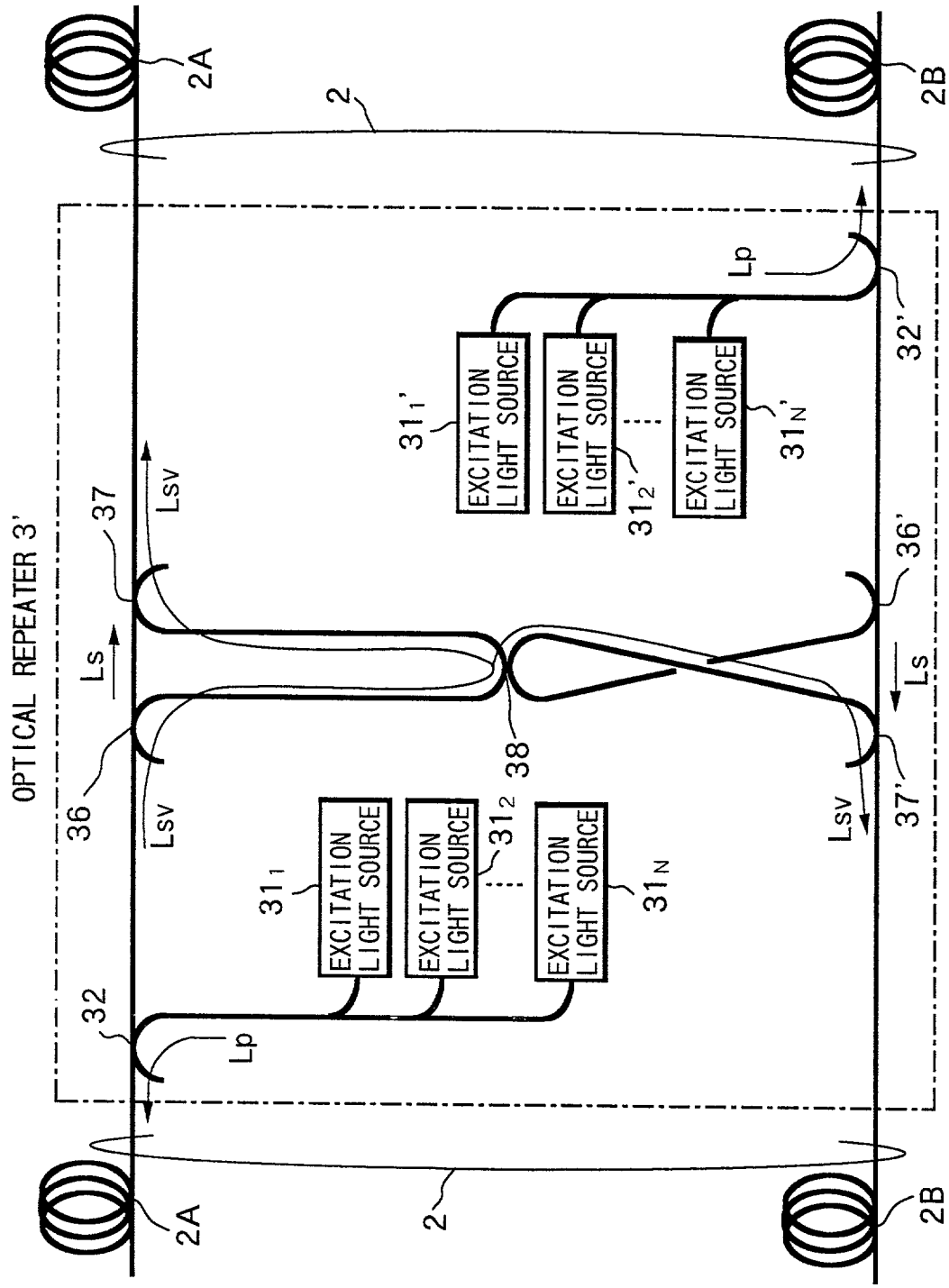
FIG. 3 is a view showing an essential constitution of a second embodiment of a supervisory controlling system according to of the present invention.

FIG. 3 is a view showing an essential constitution of the supervisory controlling system according to the second embodiment. Like reference numerals as used for the constitution of the first embodiment are used to denote corresponding elements, and the same rule applies corresponding to other embodiments to be described later.

In FIG. 3, when the optical transmission path 2 that connects between the transmission side terminal device and reception side terminal device (both not shown) includes an up-link 2A and a down-link 2B, the supervisory controlling system of the second embodiment comprises a loop-back circuit for the supervisory control signal light Lsv, enabling each optical repeater 3' on the optical transmission path 2 to once separate the supervisory control signal light Lsv having been Raman amplified by being propagated through the links 2A, 2B in the same way as in the first embodiment, and to branch the separated supervisory control signal light Lsv into two, and to return one of the branched lights into the originating link and to send the other branched light into the opposite link to be folded.

The loop-back circuit of each optical repeater 3' is exemplarily constituted such that WDM couplers 36, 37 are provided at a latter stage (rightward direction in FIG. 3) of the WDM coupler 32 that supplies excitation lights to the up-link 2A, in an optical path within the optical repeater 3' connected to the up-link 2A, WDM couplers 36', 37' are provided at a latter stage (leftward direction in FIG. 3) of a WDM coupler 32' that supplies excitation lights to the down-link 2B, in an optical path within the optical repeater 3' connected to the down-link 2B, and further, the WDM couplers 36, 37 at the up-link 2A side and the WDM couplers 36', 37' at the down-link 2B side are mutually connected via an optical coupler 38.

The WDM coupler 36 is to separate the supervisory control signal light Lsv from the lights propagated through the up-link 2A, to send the separated light Lsv to the optical coupler 38. Further, the WDM coupler 36' is to separate the supervisory control signal light Lsv from the lights propagated through the down-link 2B, to send the separated light Lsv to the optical coupler 38. Herein, the WDM coupler 36 functions as a first separating section while the WDM coupler 36' functions as a second separating section.

The optical coupler 38 includes two input ports and two output ports. One of the input ports is connected to the port of the WDM coupler 36 from which the supervisory control signal light Lsv is output, and the other input port is connected to the port of the WDM coupler 36' from which the supervisory control signal light Lsv is output. One of the output ports is connected to the port of the WDM coupler 37 into which the supervisory control signal light Lsv is input, and the other output port is connected to the port of the WDM coupler 37' into which the supervisory control signal light Lsv is input. The optical coupler 38 branches each supervisory control signal light Lsv to be input to each input port at a previously set branching ratio (such as 20:1), to output the branched lights from the output ports, respectively. Herein, the optical coupler 38 functions as the first branching section and second branching section.

The WDM coupler 37 is to multiplex the supervisory control signal light Lsv output from the one output port of the optical coupler 38, onto the signal lights Ls passed through the WDM coupler 36. The WDM coupler 37' is to multiplex the supervisory control signal light Lsv output from the other output port of the optical coupler 38, onto the signal lights Ls passed through the WDM coupler 36'. Herein, the WDM coupler 37 functions as a first up-link multiplexing section and a second up-link multiplexing section, and the WDM coupler 37' functions as a first down-link multiplexing section and a second down-link multiplexing section.

In the loop-back circuit having the above described constitution, with regard to the lights having been propagated through the up-link 2A, the Raman amplified supervisory control signal light Lsv is wavelength separated by the WDM coupler 36, from the lights having passed through the WDM coupler 32 for supplying the excitation lights Lp to the up-link 2A, and input to the one input port of the optical coupler 38, to be branched at a branching ratio of such as 20:1. Then, the supervisory control signal light Lsv at the higher branching ratio side is output from the optical coupler 38 to the WDM coupler 37 so as to be returned to the up-link 2A, while the supervisory control signal light Lsv at the lower branching ratio side is output from the optical coupler 38 to the WDM coupler 37' so as to be sent to the down-link 2B to be folded.

With regard to the lights having been propagated through the down-link 2B, the Raman amplified supervisory control signal light Lsv is wavelength separated by the WDM coupler 36', from the lights having passed through the WDM coupler 32' for supplying the excitation lights Lp to the down-link 2B and input to the other input port of the optical coupler 38, so as to be branched at a branching ratio of such as 20:1. Then, the supervisory control signal light Lsv at the higher branching ratio side is output from the optical coupler 38 to the WDM coupler 37' so as to be returned to the down-link 2B, while the supervisory control signal light Lsv at the lower branching ratio side is output from the optical coupler 38 to the WDM coupler 37 so as to be sent to the up-link 2A to be folded.

By providing the loop-back circuit of the supervisory control signal light Lsv in each optical repeater 3', in each of the terminal devices connected via the optical transmission path 2, it becomes possible to detect the supervisory control signal light Lsv that has been sent out from the terminal device itself and folded back from the optical repeaters 3', so as to obtain information about such as optical powers of input signals of the optical repeaters 3', respectively. The supervisory control of optical repeaters 3' based on such loop-back of the supervisory control signal light Lsv can be readily realized, by amplifying the supervisory control signal light Lsv due to the Raman effect by the signal lights Ls acting as the excitation lights, and setting the wavelength λsv of the supervisory control signal light Lsv to the outside of the wavelength band of the signal lights Ls. Namely, it has been difficult to separate a supervisory control signal light from signal lights in such conventional system in which the signal lights are modulated or the supervisory control signal light is arranged within or near the wavelength band of the signal lights. However, according to the present invention, it becomes possible to readily separate the supervisory control signal light Lsv from the signal lights Ls even by a general WDM coupler, by utilizing the Raman amplification to set the wavelength λsv of the supervisory control signal light Lsv to be apart from the wavelength band of the signal lights.

Figure 4:
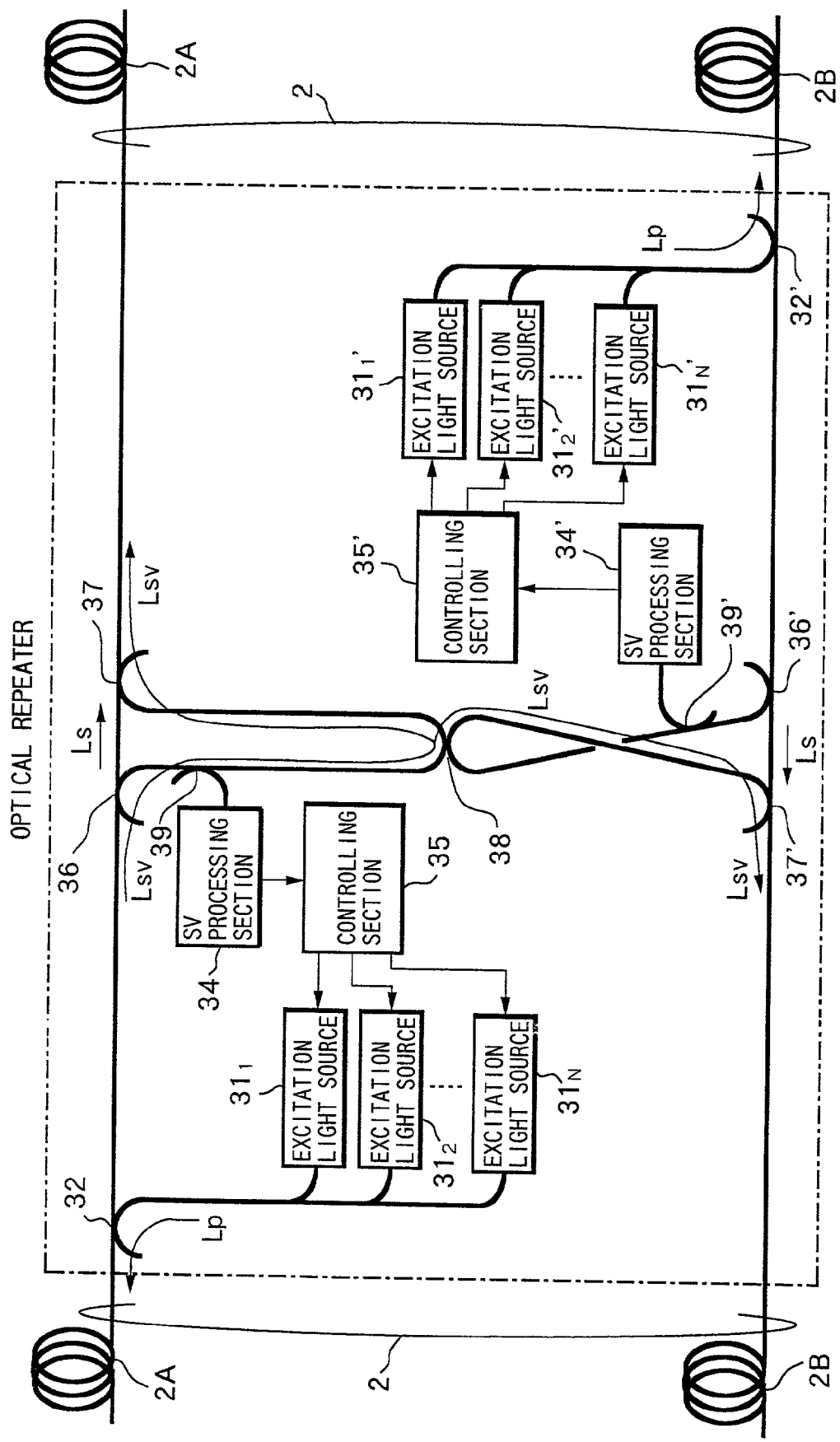
FIG. 4 is a view showing another exemplary constitution concerning the second embodiment.

In the second embodiment, there has been described a constitutional example where the driving conditions of the excitation light sources within the optical repeater 3' are not particularly controlled. However, similarly to the first embodiment, the constitution may be such that the supervisory control signal lights having been propagated through the links 2A, 2B is monitored to detect the information about the transmission states of the signal lights Ls, to thereby control the driving conditions of the excitation light sources in accordance with such information. FIG. 4 shows an example of such a constitution. In FIG. 4, for example, a part of the supervisory control signal light Lsv separated by the associated one of the WDM couplers 36, 36' is branched by the associated one of optical couplers 39, 39' to be sent to the associated one of SV processing sections 34, 34', respectively.

In the aforementioned first and second embodiments, there has been considered the Raman amplification as the means for amplifying the signal lights up to the required levels in each optical repeater. However, the amplifying means itself for the signal lights in the present invention is not limited to the Raman amplification, and it is possible to amplify the signal light by adopting known optical amplifiers, such as, an optical fiber amplifier utilizing an optical fiber doped with rare earth element or a semiconductor optical amplifier. Even in case of amplifying the signal lights by such a known optical amplifier, the amplification of the supervisory control signal light shall be performed due to the Raman amplification by the signal lights acting as the excitation lights.

There will be described hereinafter a third embodiment of a supervisory controlling system of an optical repeater according to the present invention.

Figure 5:
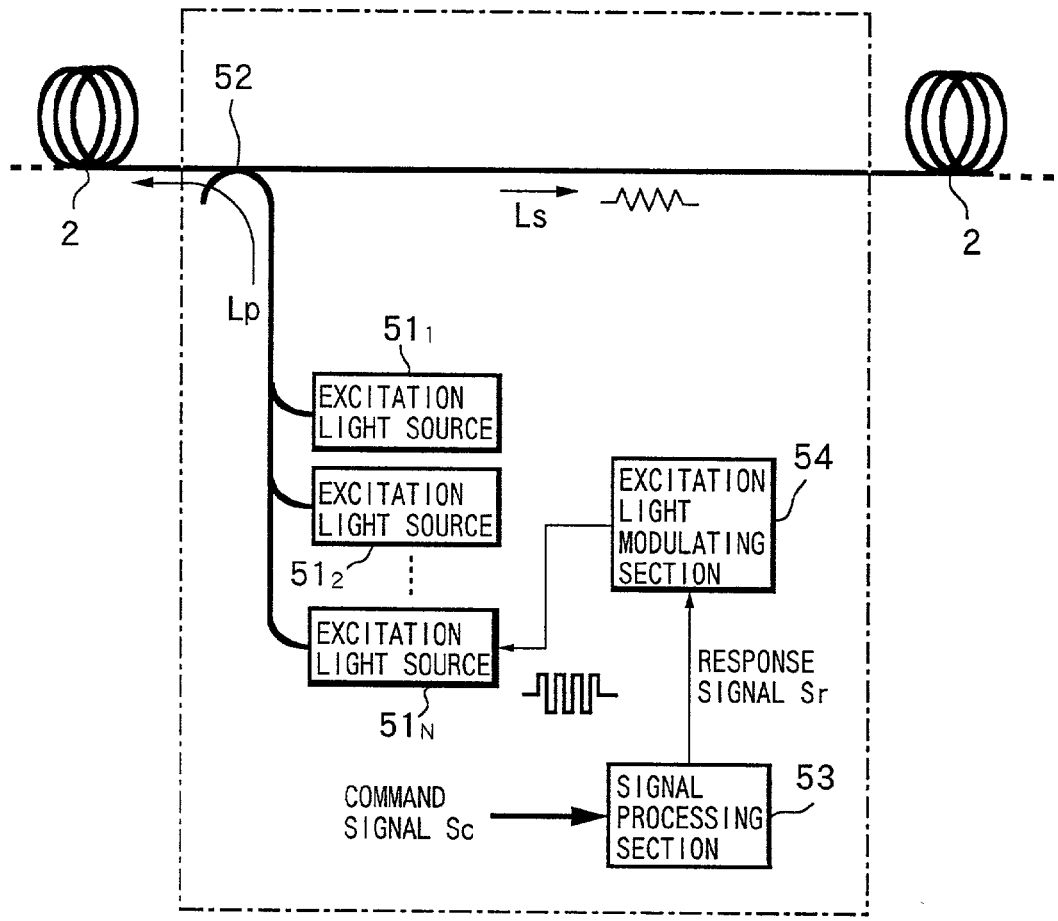
FIG. 5 is a view showing a constitution of an optical repeater to be utilized in a third embodiment of a supervisory controlling system of an optical repeater according to the present invention.

FIG. 5 is a view showing a constitution of the optical repeater in the supervisory controlling system of the third embodiment.

In FIG. 5, the supervisory controlling system of the third embodiment is constituted such that, for an optical amplifying-and-repeating transmission system for amplifying a WDM signal light propagated through the optical transmission path 2 by each optical repeater 5 so as to repeatedly transmit the WDM signal light, when each optical repeater 5 is constituted to supply lights generated at excitation light sources $51_1$ to $51_N$ in N numbers as excitation lights Lp, to the optical transmission path 2 via a WDM coupler 52 so as to Raman amplify the WDM signal light Ls in the optical transmission path 2, there are provided a signal processing section 53 and an excitation light modulating section 54 within the optical repeater 5, to thereby return a response signal Sr to a command signal Sc to be given to the optical repeater 5 as supervisory control information.

The signal processing section 53 receives the command signal Sc transmitted from such as a terminal device (not shown), and generates the response signal Sr to the command signal Sc, to thereby output the response signal Sr to the excitation light modulating section 54. Note, the command signal Sc and response signal Sr are the same as a supervisory controlling command and a response signal to be utilized in supervisory control of a typical optical repeater.

The excitation light modulating section 54 is to modulate, in accordance with the response signal Sr from the signal processing section 53, the excitation light to be generated at the excitation light source (such as the excitation light source $51_N$, for example) enabling to Raman amplify the longer wavelength side optical signal included in the WDM signal light Ls, among the excitation light sources $51_1$ to $51_N$, by the frequency lower than the signal bit rate frequency of the WDM signal light Ls.

Figure 6:
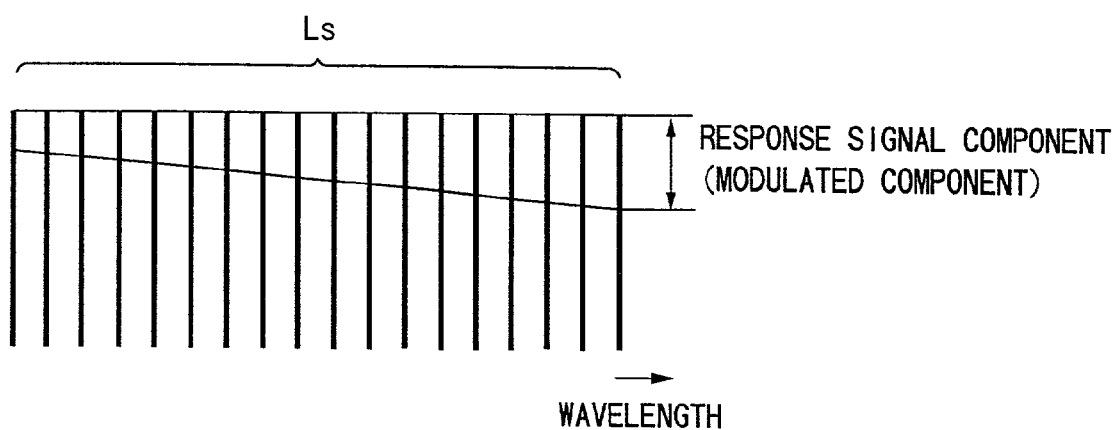
FIG. 6 is a view showing an example of signal lights to be Raman amplified when all excitation lights are modulated.

In this respect, in a case where the response signal Sr to the command signal Sc is superimposed onto the WDM signal light Ls to return the superimposed signal to the terminal device, it is typical, in conventional optical repeaters utilizing such as EDFA's, to adopt a system to modulate excitation lights of EDFA's so as to substantially equally modulate the optical signals of all wavelengths included in the WDM signal light Ls, to thereby superimpose the response signal Sr onto the WDM signal light Ls. If such a conventional superimposing system is applied to the Raman amplification as mentioned above so as to modulate all excitation lights to be generated by the excitation light sources $51_1$ to $51_N$, the longer wavelength side optical signals among a plurality of optical signals included in the WDM signal light Ls are likely to be largely modulated as shown in FIG. 6, for example, due to the wider bands of Raman amplification by the excitation lights of respective wavelengths, for example. Therefore, there is a possibility that penalty at the longer wavelength side is increased as compared with that at the shorter wavelength side, in a receipt processing for the WDM signal light Ls at the terminal device. To avoid such a situation, it may be enough to individually adjust the modulation factors for the excitation light sources $51_1$ to $51_N$, respectively. However, it is actually difficult to perform such an adjustment of the modulation factors.

Figure 7:
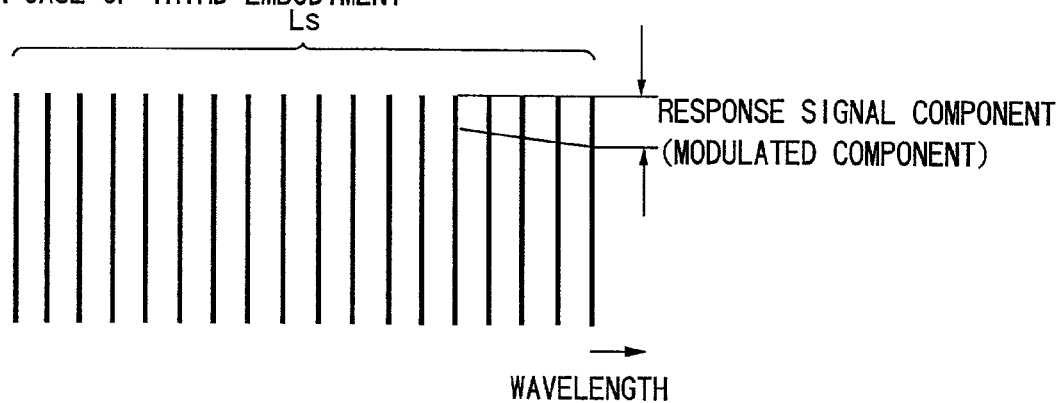
FIG. 7 is a view showing an example of signal lights to be Raman amplified in the third embodiment.

Thus, in the optical repeater 5 of the third embodiment, the excitation light to be output from the excitation light source $51_N$ is modulated in accordance with the response signal Sr to the command signal Sc, so that the response signal Sr is superimposed only onto the longer wavelength side optical signals of the WDM signal light Ls, that are to be Raman amplified by the excitation light. FIG. 7 shows an example of a modulated state of the WDM signal light Ls, in this case.

By simply superimposing the response signal Sr only onto the longer wavelength side optical signals of the WDM signal light Ls in the above manner, it is possible to receive the response signal Sr from each optical repeater 5 by detecting the modulated components of the longer wavelength side optical signals at the terminal device. Thus, it becomes unnecessary to adjust the modulation factors of the excitation light sources $51_1$ to $51_N$, thereby enabling to prevent an increase of penalty at the terminal device by merely performing a simple adjustment of the modulation factor of the excitation light source $51_N$.

In the third embodiment, the response signal Sr has been superimposed onto the longer wavelength side optical signals included in the WDM signal light Ls, by modulating the single excitation light source $51_N$. However, the present invention is not limited thereto, and the modulation may be performed onto two or more excitation light sources enabling to Raman amplify the longer wavelength side optical signals included in the WDM signal light Ls.

There will be described hereinafter a fourth embodiment of a supervisory controlling system of an optical repeater according to the present invention. In this embodiment, there shall be considered a supervisory controlling system corresponding to an optical repeater obtained by combining the amplification of signal lights by the EDFA with the Raman amplification, as an applied example of the aforementioned third embodiment.

Figure 8:
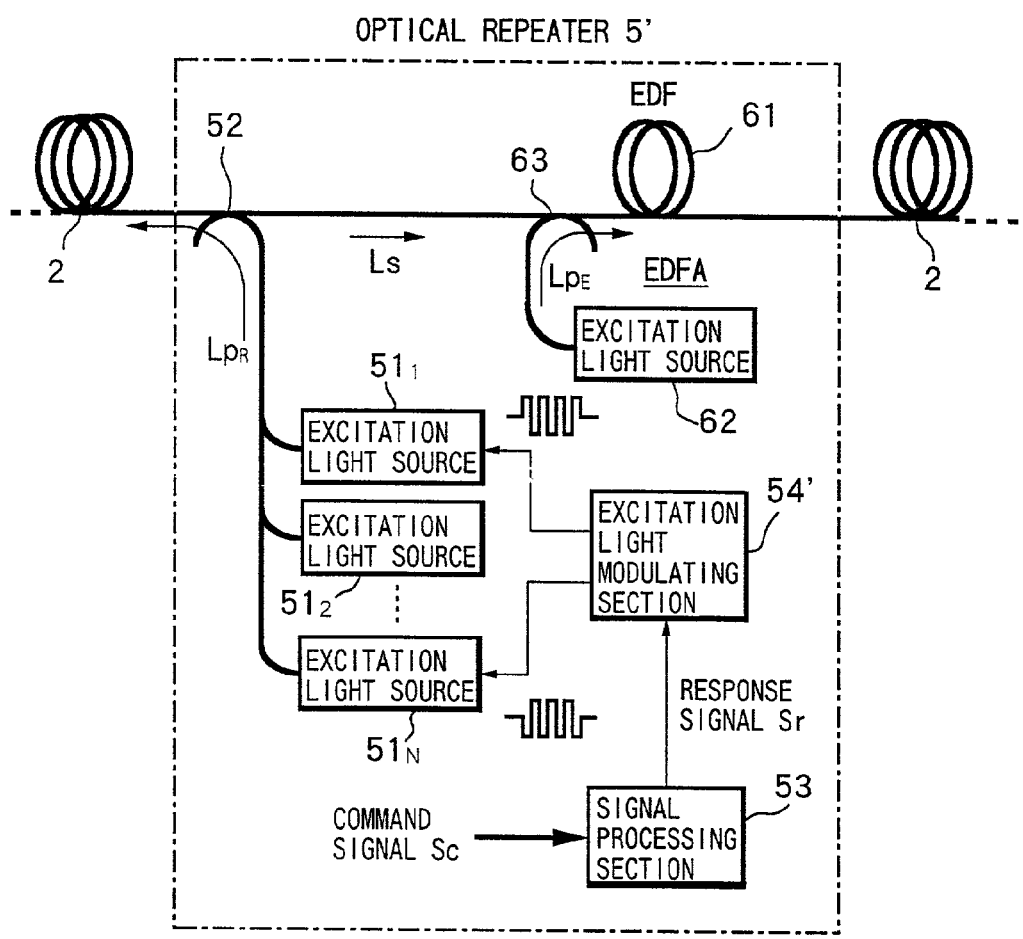
FIG. 8 is a view showing a constitution of an optical repeater to be used in a fourth embodiment of a supervisory controlling system of the optical repeater according to the present invention.

FIG. 8 is a view showing a constitution of the optical repeater in the supervisory controlling system of the fourth embodiment.

In FIG. 8, the constitution of an optical repeater 5' of the supervisory controlling system of the fourth embodiment is different from the optical repeater 5 according to the third embodiment, in that there is additionally provided an EDFA for amplifying the signal lights Ls at the latter stage of the WDM coupler 52, and there is provided an excitation light modulating section 54' instead of the excitation light modulating section 54, in the optical path connected to the optical transmission path 2. The remaining portions are the same as the third embodiment.

The EDFA within the optical repeater 5' is to supply, via a WDM coupler 63, an excitation light $LP_E$ generated by an excitation light source 62 to an erbium-doped fiber (EDF) 61, for example, provided on the optical path through which the signal lights Ls at the latter stage of the WDM coupler 52 are propagated, so as to amplify the signal lights Ls up to required levels by virtue of the "stimulated emission effect" caused when the signal lights Ls pass through the erbium-doped fiber 61 that has been brought to an excited state.

The excitation light modulating section 54' is to modulate, in accordance with the response signal Sr from the signal processing section 53, the excitation light to be generated at the excitation light source (such as the excitation light source $51_N$, for example) enabling to Raman amplify the longer wavelength side optical signals included in the WDM signal light Ls, of the excitation light sources $51_1$ to $51_N$ as well as the excitation light to be generated at the excitation light source (such as the excitation light source $51_1$) enabling to Raman amplify the shorter wavelength side optical signals included in the WDM signal light Ls, by the frequency lower than the signal bit rate frequency of the WDM signal light Ls. This excitation light modulating section 54' applies the modulation of mutually opposite phases onto the excitation lights to be generated by the excitation light sources $51_1$, $51_N$, respectively, to thereby avoid attenuation of the modulated components at the EDFA to be described hereinafter.

Figure 9:
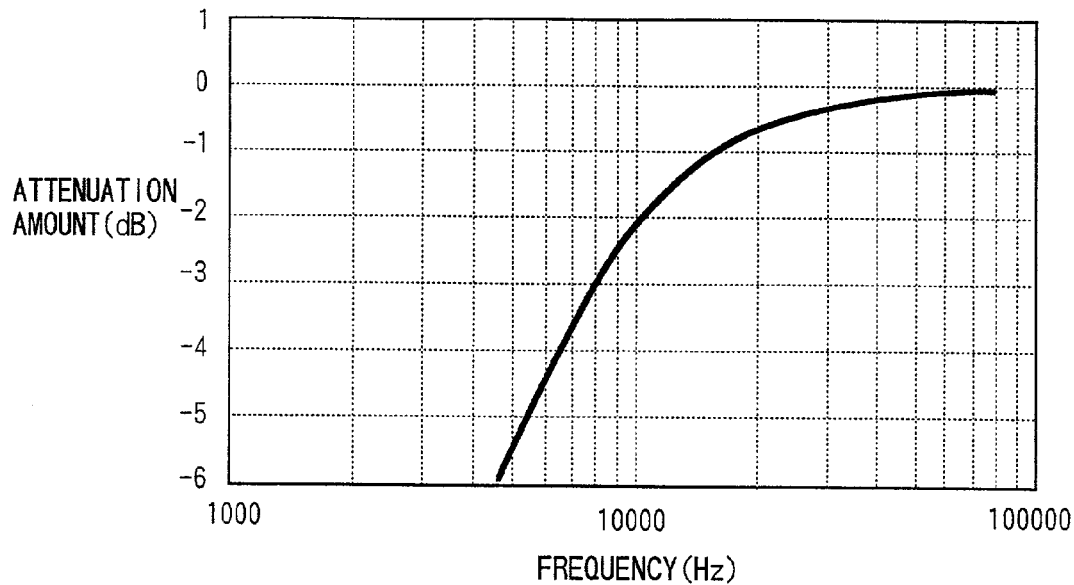
FIG. 9 is a graph showing an example of a frequency characteristic of a typical EDFA.

In utilizing an optical repeater obtained by combining the amplification of signal lights by an EDFA with the Raman amplification, it is known that a pass-band of a typical EDFA has a low frequency side cut-off near a range of 6 kHz to 8 kHz such as shown in FIG. 9. Thus, if the modulation is performed onto the signal lights Ls in accordance with the response signal Sr while setting the frequencies of carrier waves in a range of about 10 kHz to 100 kHz, the modulated components are attenuated when the signal lights Ls pass through the EDFA. Even if the attenuation amount of the modulated components in the EDFA per one optical repeater is small, the attenuation amount is progressively increased as the signal lights Ls are repeatedly transmitted through a plurality of optical repeaters on the system, thereby resulting in a possibility that the response signal Sr is not received by the terminal device. Specifically, even if the attenuation amount per one optical repeater is only 0.1 dB, the modulated components of the signal lights Ls are attenuated by 10 dB after repeated through a hundred of optical repeaters.

Figure 10:
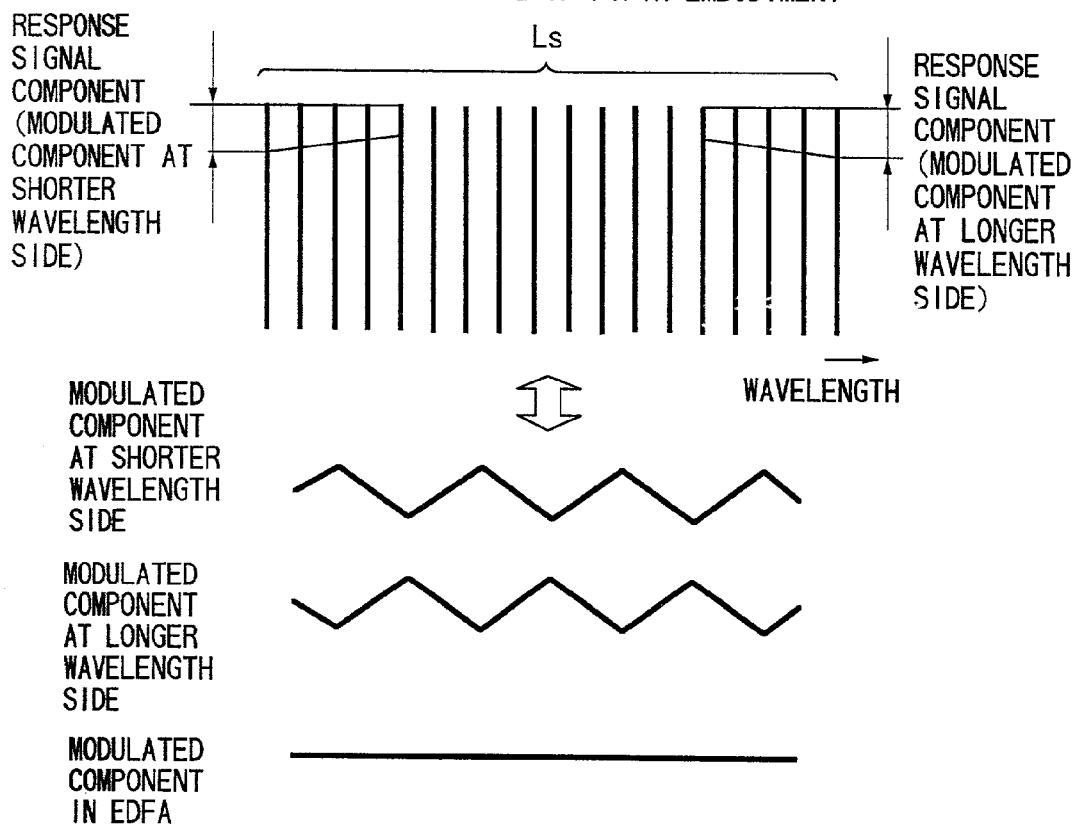
FIG. 10 is a view for explaining a relationship between the Raman amplified signal lights and the modulated states of excitation lights in the fourth embodiment.
Figure 11:
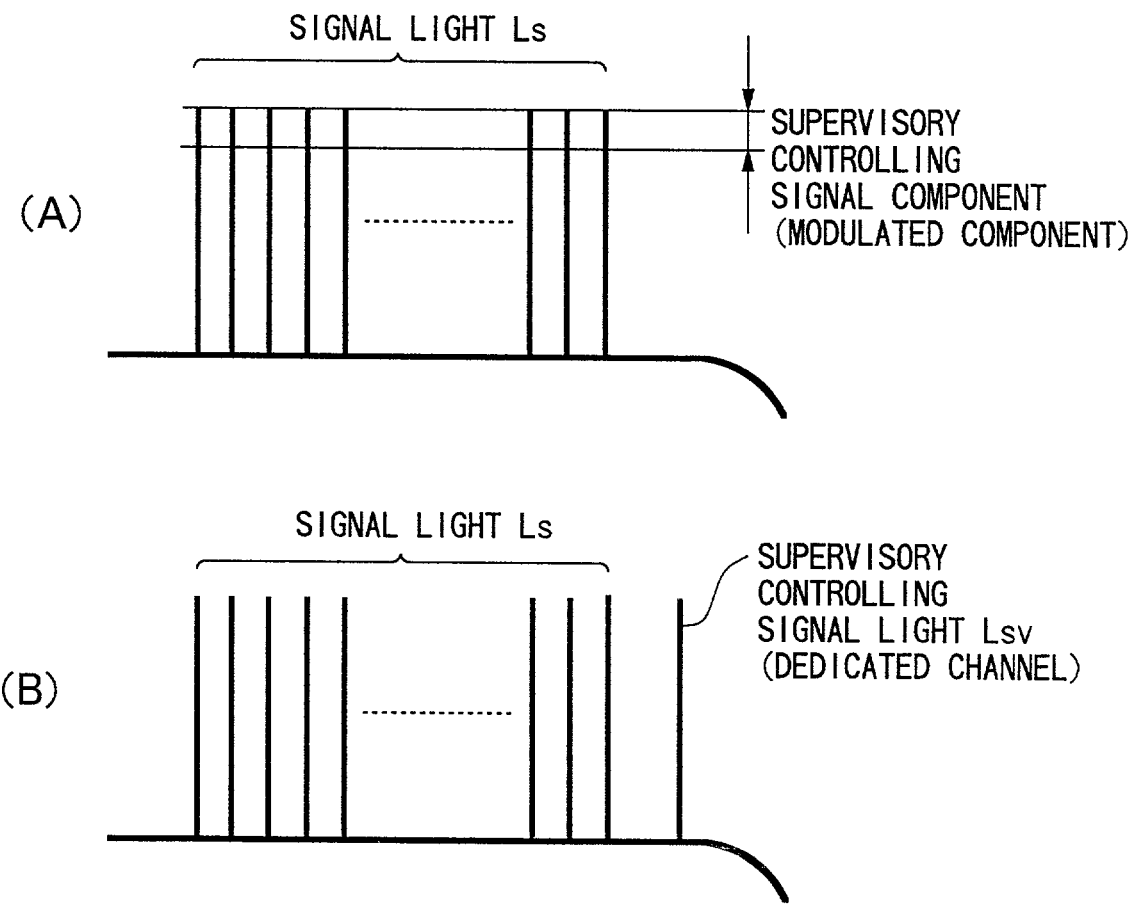

To enable the transmission of the response signal Sr while avoiding such attenuation of the modulated components due to the cut-off of the pass-band of the EDFA, the fourth embodiment is constituted to apply the modulation of mutually opposite phases onto both of the longer wavelength side and shorter wavelength side signal lights Ls, respectively, as shown in a conceptual view of FIG. 10. In this way, at the EDFA, it looks as if substantially no total variations of the signal lights Ls were caused by the modulation (see the lower half of FIG. 10). Thus, even when the signal lights Ls are modulated by low frequency near the cut-off frequency, the modulated components are scarcely attenuated by the EDFA.

In the above manner, the response signal Sr that has been superimposed onto the signal lights Ls by applying the modulation of the mutually opposite phases to the longer wavelength side and shorter wavelength side of the signal lights Ls, can be received, by demultiplexing the optical signals at the longer wavelength side and shorter wavelength side included in the signal lights Ls at the terminal device to thereby extract the frequency components of the opposite phases. Thus, it is possible to realize the transmission of the response signal Sr from the optical repeater 5' including the EDFA to the terminal device, by the modulation of the excitation lights for the Raman amplification. Further, in such a case where each terminal device receives and processes optical signals demultiplexed for each wavelength by amplifying such optical signals by EDFA's, the modulated components of the respective optical signals are attenuated by the EDFA's of the terminal device, to thereby avoid increased penalty at the terminal device due to the modulation onto the longer wavelength side and shorter wavelength side of the signal lights Ls.

In the fourth embodiment, in order to superimpose the response signal Sr onto the optical signals at the longer wavelength side and shorter wavelength side of the WDM signal light Ls, the modulation has been applied onto the excitation light generated by the one excitation light source at the longer wavelength side and onto the excitation light generated by the one excitation light source at the shorter wavelength side. However, the present invention is not limited thereto, and the modulation may be applied onto two or more excitation light sources at each of the longer wavelength side and shorter wavelength side.

In each of the aforementioned first through fourth embodiments, there has been illustrated a so-called distributed Raman amplification type constitution in which the whole of the optical transmission path 2 connected to each optical repeater is the Raman amplifying medium. However, the present invention is not limited thereto, and it is also possible to adopt a so-called concentrated Raman amplification type constitution in which a Raman amplifying medium having characteristics different from those of the optical transmission path 2 is separately provided on the optical transmission path 2 or within the optical repeater.

What is claimed is:

1. A supervisory controlling method for supervising and controlling an optical repeater based on supervisory control information to be transmitted together with a signal light propagated through an optical transmission path in an optical amplifying-and-repeating transmission system for amplifying and repeatedly transmitting said signal light by said optical repeater, comprising:

Raman amplifying a supervisory control signal light having a wavelength capable of being amplified based on the Raman effect in a Raman amplifying medium on said optical transmission path, the signal light acting as an excitation light for purposes of said Raman amplifying;

supervising and controlling said optical repeater in accordance with said Raman amplified supervisory control signal light;

when said optical transmission path includes an up-link and a down-link, at said optical repeater, separating said Raman amplified supervisory control signal light from the lights propagated through said up-link;

branching the separated supervisory control signal light into two branched lights at a previously set ratio, so that one of said branched lights is returned to said up-link and the other branched light is sent to said down-link to be folded;

at the same time, separating said Raman amplified supervisory control signal light from the lights propagated through said down-link; and branching the separated supervisory control signal light into two branched lights at a previously set ratio, so that one of said branched lights is returned to said down-link and the other branched light is sent to said up-link to be folded.

2. A supervisory controlling method for supervising and controlling an optical repeater according to claim 1, further comprising:

setting the wavelength of the supervisory control signal light at the outside of the wavelength band of said signal light.

3. A supervisory controlling method for supervising and controlling an optical repeater according to claim 1, wherein said Raman amplifying comprises amplifying said signal light due to the Raman effect by the excitation light supplied from said optical repeater, so that said supervisory control signal light is Raman amplified by the Raman amplified signal light acting as the excitation light.

4. A supervisory controlling method for supervising and controlling an optical repeater according to claim 3, further comprising:

monitoring said Raman amplified supervisory control signal light by said optical repeater to thereby detect information about a transmission state of the signal light, and controlling a supplying state of the excitation light from said optical repeater to said Raman amplifying medium based on the detected information, to thereby control a Raman amplification state of said supervisory control signal light in said Raman amplifying medium.

5. A supervisory controlling method for supervising and controlling an optical repeater based on supervisory control information to be transmitted together with a signal light propagated through an optical transmission path in an optical amplifying-and-repeating transmission system for amplifying and repeatedly transmitting said signal light by said optical repeater, comprising:

Raman amplifying a supervisory control signal light having a wavelength capable of being amplified based on the Raman effect in a Raman amplifying medium on said optical transmission path, the signal light acting as an excitation light for purposes of said Raman amplifying;

supervising and controlling said optical repeater in accordance with said Raman amplified supervisory control signal light;

wherein, when said optical transmission path includes an up-link and a down-link, said optical repeater comprises a first optical amplifying portion that amplifies the signal light propagated through said up-link, and a second optical amplifying section that amplifies the signal light propagated through said down-link, and the wavelength of said supervisory control signal light is at the outside of amplification bands of said first and second optical amplifying sections, wherein said method further comprises:

at said optical repeater, separating said Raman amplified supervisory control signal light from the lights propagated through said up-link connected to an input side of said first optical amplifying section;

branching the separated supervisory control signal light into two branched lights at a previously set ratio, so that one of said branched supervisory control signal lights is returned to said up-link connected to an output side of said first optical amplifying section and the other supervisory control signal light is sent to said down-link connected to an output side of said second optical amplifying section to be folded;

at the same time, separating said Raman amplified supervisory control signal light from the lights propagated through said down-link connected to an input side of said second optical amplifying section, and branching the separated supervisory control signal light into two branched lights at a previously set ratio, so that one of said branched supervisory control signal lights is returned to said down-link connected to the output side of said second optical amplifying section and the other branched light is sent to said up-link connected to the output side of said first optical amplifying section to be folded.

6. A supervisory controlling system for supervising and controlling an optical repeater based on supervisory control information to be transmitted together with a signal light propagated through an optical transmission path in an optical amplifying-and-repeating transmission system for amplifying and repeatedly transmitting said signal light by said optical repeater, comprising:

a supervisory control signal light generating section that generates a supervisory control signal light having a wavelength capable of being amplified by the Raman effect on said supervisory control signal light, wherein said optical repeater is supervised and controlled in accordance with said supervisory control signal light that is generated by said supervisory control signal light generating section and Raman amplified in a Raman amplifying medium on said optical transmission path by said signal light acting as an excitation light for purposes of said Raman amplifying;

wherein when said optical transmission path includes an up-link and a down-link, said optical repeater comprises:

a first separating section that separates said Raman amplified supervisory control signal light from the lights propagated through said up-link, a first branching section that branches the supervisory control signal light separated by said first separating section into two branched lights at a previously set ratio, a first up-link multiplexing section that returns one of the supervisory control signal lights branched by said first branching section to said up-link, a first down-link multiplexing section that sends the other supervisory control signal light branched by said first branching section to said down-link to be folded, a second separating section that separates said Raman amplified supervisory control signal light from the lights propagated through said down-link, a second branching section that branches the supervisory control signal light separated by said second separating section into two branched lights at a previously set ratio, a second down-link multiplexing section that returns one of the supervisory control signal lights branched by said second branching section to said down-link, and a second up-link multiplexing section that sends the other supervisory control signal light branched by said second branching section to said up-link to be folded.

7. A supervisory controlling system for supervising and controlling an optical repeater according to claim 6, wherein said supervisory control signal light generating section generates said supervisory control signal light having the wavelength set at the outside of the wavelength band of said signal light.

8. A supervisory controlling system for supervising and controlling an optical repeater according to claim 6, wherein:

said optical repeater includes an excitation light supplying section that supplies an excitation light to said Raman amplifying medium on said optical transmission path, the signal light propagated through said optical transmission path is amplified due to the Raman effect by the excitation light from said excitation light supplying section, and said supervisory control signal light is Raman amplified by the Raman amplified signal light acting as the excitation light.

9. A supervisory controlling system for supervising and controlling an optical repeater according to claim 8, wherein said optical repeater includes: a detecting section that monitors said Raman amplified supervisory control signal light to thereby detect information about a transmission state of the signal light, and a controlling section that controls a supplying state of the excitation light from said excitation light supplying section to said Raman amplifying medium, corresponding to the information detected by said detecting section, to thereby control a Raman amplification state of said supervisory control signal light in said Raman amplifying medium.

10. A supervisory controlling system for supervising and controlling an optical repeater based on supervisory control information to be transmitted together with a signal light propagated through an optical transmission path in an optical amplifying-and-repeating transmission system for amplifying and repeatedly transmitting said signal light by said optical repeater, comprising:

a supervisory control signal light generating section that generates a supervisory control signal light having a wavelength capable of being amplified by the Raman effect on said supervisory control signal light;

wherein said optical repeater is supervised and controlled in accordance with said supervisory control signal light that is generated by said supervisory control signal light generating section and Raman amplified in a Raman amplifying medium on said optical transmission path by said signal light acting as an excitation light for purposes of said Raman amplifying;

wherein, when said optical transmission path includes an up-link and a down-link, said optical repeater comprises:

a first optical amplifying section that amplifies the signal light propagated through said up-link;

a second optical amplifying section that amplifies the signal light propagated through said down-link, wherein the wavelength of said supervisory control signal light is at the outside of the amplification bands of said first and second optical amplifying sections;

a first separating section that separates said Raman amplified supervisory control signal light from the lights propagated through said up-link connected to an input side of said first optical amplifying section;

a first branching section that branches the supervisory control signal light separated by said first separating section into two branched lights at a previously set ratio;

a first up-link multiplexing section that returns one of the supervisory control signal lights branched by said first branching section to said up-link connected to an output side of said first optical amplifying section;

a first down-link multiplexing section that sends the other supervisory control signal light branched by said first branching section to said down-link connected to an output side of said second optical amplifying section to be folded;

a second separating section that separates said Raman amplified supervisory control signal light from the lights propagated through said down-link connected to an input side of said second optical amplifying section;

a second branching section that branches the separated supervisory control signal light into two branched lights at a previously set ratio;

a second down-link multiplexing section that returns one of supervisory control signal lights branched by said second branching section to said down-link connected to the output side of said second optical amplifying section; and a second up-link multiplexing section that sends the other supervisory control signal light to said up-link connected to the output side of said first optical amplifying section to be folded.

\* \* \* \* \*